United States Patent
Bell et al.

(12) 
(10) Patent No.: US 6,566,304 B1
(45) Date of Patent: May 20, 2003

(54) BIOGENIC CONTROL AND LIMITATION OF THE REPRODUCTION OF PARASITIC EARTH NEMATODES IN STOCK CULTURE

(75) Inventors: Doris Bell, Duesseldorf (DE); Bettina Kopp-Holtwiesche, Duesseldorf (DE); Stephan Von Tapavicza, Erkrath (DE)

(73) Assignee: Cognis Deutschland GmbH, Duesseldorf (DE)

(*) Notice: Subject to any disclaimer, the term of this patent is extended or adjusted under 35 U.S.C. 154(b) by 0 days.

(21) Appl. No.: 09/701,599

(22) PCT Filed: May 21, 1999

(86) PCT No.: PCT/EP99/03495

§ 371 (c)(1),
(2), (4) Date: Feb. 6, 2001

(87) PCT Pub. No.: WO99/62337

PCT Pub. Date: Dec. 9, 1999

(30) Foreign Application Priority Data

May 30, 1998 (DE) .......................................... 198 24 358

(51) Int. Cl.$^7$ ....................... A01N 47/28; A01N 57/00; A01N 57/04; A01N 57/12; A01N 57/20; A01N 57/28; C05G 3/02; C05G 3/04; C05G 3/06

(52) U.S. Cl. ........................... 504/101; 514/75; 514/77; 514/78; 514/95; 514/99; 514/102; 514/109; 514/110; 514/112; 514/114; 514/120; 514/125; 514/126; 514/129; 514/131; 514/134; 514/135; 514/136; 514/137; 514/139; 514/140; 514/141; 514/142; 514/143; 514/144; 514/145; 514/146; 514/147; 514/148; 514/558; 514/588; 514/589; 514/590; 514/591; 514/592; 514/594; 514/595; 514/596; 514/597; 514/598; 424/725; 71/23; 71/29; 71/32; 71/54; 71/903

(58) Field of Search ................................ 71/32, 54, 23, 71/29, 903; 504/101; 514/75, 77, 78, 95, 99, 102, 109, 110, 112, 114, 120, 125, 126, 129, 131, 134–137, 139–148, 558, 588, 591, 589, 590, 592, 594–598; 424/725

(56) References Cited

U.S. PATENT DOCUMENTS

| | | | |
|---|---|---|---|
| 4,230,562 A | 10/1980 | Olivieri et al. ............. | 210/610 |
| 4,414,333 A | 11/1983 | Olivieri et al. ............. | 435/243 |
| 4,536,207 A | 8/1985 | McCandliss et al. ....... | 504/292 |
| 4,576,626 A | 3/1986 | Bauer et al. .................. | 71/28 |
| 5,057,141 A | 10/1991 | Rodriquez-Kabana et al. . | 71/28 |
| 5,451,243 A | 9/1995 | Ahlnäs ....................... | 71/64.09 |
| 5,635,392 A | 6/1997 | Kopp-Holtweische et al. ... | 435/253.6 |

FOREIGN PATENT DOCUMENTS

| | | |
|---|---|---|
| DE | 27 39 428 | 3/1978 |
| DE | 42 18 243 A1 | 12/1993 |
| DE | 44 37 313 A1 | 4/1996 |
| DE | 197 48 884 | 5/1999 |
| EP | 0 068 293 A1 | 1/1983 |
| EP | 0 095 071 B1 | 11/1983 |
| EP | 0 719 780 A1 | 7/1996 |
| WO | WO 89/01462 | 2/1989 |
| WO | WO 89/08628 | 9/1989 |
| WO | WO 93/01150 | 1/1993 |

OTHER PUBLICATIONS

WPIDS (Derwent) abstract, accession No. 1984–173760, abstracting JP 59–95294 (Jun. 1984).*

Crow, W.T., et al: "Responses of *Meloidogyne arenaria* and *M. incognita* to green manures and supplemental urea in glasshouse culture", Journal of Nematology, Dec., 1996, vol. 28, (4 Suppl.), pp. 648–654, Publisher: Lakeland, Fla.: Society of Nematologists, Coden: JONEB5;ISSN: 0022–300X, XP002115728, University of Florida, Gainesville, FL.

Database WPI, Derwent Publications Ltd., London, GB; AN 84–217104, XP002115730, TOMO–E, Kagaku Kogyo: "Controlling nematode parasites on plants–by applying a urea–aldehyde condensate to soil"; JP 59 128310 A (TOMO–N), Jul. 24, 1984.

R.C. Cooke, 1963, "Succession of Nematophagous Fungi During the Decomposition or Organic Matter in Soil", Nature, No. 4863, (Jan. 12, 1963), p. 205.

S. Hoffmann–Hergarten, et al., "Untersuchung zur Steigerung der Wirkung nematodenfangender Pilze gegen den Heterodera–schachtii Frühbefall durch organische Dünger", Zeitschrift für Pflanzenkrankheiten und Pflanzenschutz, Journal of Plant Diseases and Protection, 100 (2), pp. 170–175, 1993.

R. Rodriguez–Kabana, et al., "Plant and Soil", 100, Martinus Nijhoff Publishers, Dordrecht, (1987), pp. 237–247.

J. Coosemans, "Methods for Introducing *Verticillium chlamydosporium* into soil", Edited by B. R. Kerry & D. H. Crump, Methods for Studying Nematophagus Fungi, IOBC/WPRS Bulletin XIV/2; (1991), pp. 39–46.

A. Ciancio, "Observations on the Nematicidal Properties of Some Mycotoxins", Fundam. Appl. Nematol., (1995), 18 (5), pp. 451–454.

H. Börner, "Pflanzenkrankheiten und Pflanzenschutz", 5$^{th}$ Edition, Verlag Eugen Ulmer, Stuttgart, (1983), pp. 128–132.

* cited by examiner

*Primary Examiner*—John Pak
(74) *Attorney, Agent, or Firm*—John E. Drach

(57) ABSTRACT

The invention relates to use of (a) compounds of phosphorus containing at least partly lipophilic organic radicals together with (b) urea and/or urea derivatives in selected quantity ratios of (a) to (b) as a soil additive for biologically controlling plant-parasitic soil nematodes by strengthening the correspondingly antagonistic soil potential, more particularly by strengthening the growth of antagonistic and/or nematicidal rhizosphere bacteria and/or corresponding mycorrhiza strains—and at the same time strengthening the growth of cultivated plants in soil. The multicomponent mixtures which strengthen bacterial growth are preferably introduced into the region of the plant roots in the form of an aqueous preparation using plant-compatible emulsifiers before and/or during plant growth. Components (a) and (b) are used in such quantity ratios that the ratio by weight of C to N is no higher than 6:1 and preferably no higher than 5:1.

18 Claims, No Drawings

BIOGENIC CONTROL AND LIMITATION OF THE REPRODUCTION OF PARASITIC EARTH NEMATODES IN STOCK CULTURE

This application is a 371 of PCT/EP99/03495, filed on May 21, 1999.

BACKGROUND OF THE INVENTION

The significance of native plant-parasitic nematode strains in crop farming and the crop failures and growth depressions which they cause have been known to experts for decades. In order to combat these unwanted restrictions in arable farming, practice and scientific research have worked out a number of countermeasures. Thus, crop rotation—for example sugar beet, winter wheat and winter barley in a three-year cycle—can contribute towards easing the problems under discussion. Today, the use of synthetic nematicides is at least seriously restricted or prohibited over wide areas of agricultural land on account of the secondary damage which they cause. The incorporation of selected organic substances for improving soil or for controlling nematodes has been established practice for decades. The success of such measures is understood to involve a complex interaction between all soil organisms, see for example R. C. COOKE, 1963, "Succession of Nematophagous Fungi During the Decomposition or Organic Matter in Soil", Nature 4863; 205 and S. HOFFMANN-HERGARTEN et al., 1993, "Untersuchungen zur Steigerung der Wirkung nematodenfangender Pilze gegen den Heterodera-schachtii Frühbefall durch organische Dünger", Zeitschrift für Pflanzenkrankheiten und Pflanzenschutz 100 (2); 170–175.

The relevant literature is also concerned in particular with attempts to stimulate soil microorganism flora and, more particularly, strains which are capable of developing antagonistic and/or nematicidal effects against plant-pathogenic nematodes, cf. in particular U.S. Pat. No. 5,057,141 and the literature cited therein, above all R. Rodriguez-Kabana et al. in "Plant and Soil", 100:237 to 247 (1987). According to this particular literature reference, chitin-containing materials in admixture with other organic nitrogen compounds, such as ammonium phosphate and urea, develop nematostatic and nematicidal activity in soils against plant-pathogenic nematode populations, but are not phytotoxic to the plants and actually serve as a food source. The teaching of U.S. Pat. No. 4,536,207 goes in the same direction. This document describes the nematicidal activity of a chitin-protein complex compound which is obtained from a demineralized water-insoluble chitin material and a water-insoluble protein component. For practical application, these water-insoluble fine-particle complex compounds have to be mechanically incorporated in the soil in known manner.

The teaching of the present invention as described in the following is based on the prior art as represented by the U.S. patents cited above. The key components of the mixtures described in these U.S. patents are insoluble in water. This applies in particular to their chitin or chitin complex content. Accordingly, the incorporation of the insoluble material in upper soil layers can only be usefully undertaken in those parts of the soil which do not yet bear any plants. According to U.S. Pat. No. 5,057,141, a pronounced nematicidal effect is only observed in particular in the second successive plant cycle.

By contrast, the problem addressed by the present invention was to provide a soil additive which could in introduced into the affected parts of the soil in liquid form and, more particularly, in the form of an aqueous preparation and which would lead there to rapid development of the antagonistic effects, above all of the microorganism flora active there, towards plant-pathogenic soil nematodes. At the same time, the mixture according to the invention would lend itself to introduction, more especially into the region around the plant roots, both before and also during the sowing or planting of the affected areas of soil and during subsequent plant growth. Accordingly, the teaching according to the invention would make it possible to strengthen the strains of microorganism flora, more especially bacteria and/or fungi, which are present in particular in the rhizosphere or mycorrhiza and hence in the immediate surface region of the plant roots and which are distinguished by antagonistic and/or nematicidal activity towards unwanted nematode infestation of the plant roots.

SUMMARY OF THE INVENTION

Accordingly, the present invention relates to a mixture of components (a) and (b) defined hereinafter as a soil additive in crop cultivation in cultivated soils which are infected by plant-parasitic nematodes and/or in which the desired objective of optimizing the result of crop cultivation is endangered by corresponding nematode infestation. Components of class (a) are compounds of phosphorus containing at least partly lipophilic organic radicals which are used together with (b) urea and/or urea derivatives. The components of class (a) and class (b) are used in such quantity ratios of (a) to (b) that the ratio by weight of carbon (C) to nitrogen (N) does not exceed about 6:1. In a preferred embodiment, the ratio by weight of C to N is at most about 5:1.

In another embodiment, the present invention relates to the use of phospholipids of vegetable origin in combination with urea and/or urea derivatives for the biological control of plant-parasitic soil nematodes by strengthening the correspondingly antagonistic soil potential—more especially by strengthening the growth of antagonistic and/or nematicidal rhizosphere bacteria and/or corresponding mycorrhiza strains—and at the same time promoting the growth of the cultivated plants/crops. In this embodiment, too, the mixtures according to the invention are preferably introduced into the endangered soil in the form of aqueous preparations before and/or more particularly during growth.

DESCRIPTION OF THE INVENTION

Biological life processes and the discernible effects accompanying them are known to be the summary results of highly complex microorganism interactions which can in turn can be determined by a number of external conditions or living conditions. Equal significance attaches in this regard to the growth and development both of microorganism flora and of soil flora. This applies in particular to corresponding development processes in the soil and to the secondary results which they determine in the cultivation of plants in soil. Despite this general understanding, the possibility of permanently influencing these complex and interrelated life processes is still very limited.

DE 44 37 313 A1 describes a process for improving plant growth in agriculture, forestry and horticulture by stimulating the microorganisms that live in the soil in which the plants grow. The document in question proposes the use of certain mixtures based on phospholipids, for example lecithin, and phospholipid derivatives whose use for various purposes in agriculture had already been mentioned. Thus, European patent application EP 95 071 and International patent application WO 89/8628 describe the use of phospholipids together with macronutrients as leaf fertilizers.

International patent application WO 93/1150 mentions the use of phospholipids as emulsifiers in fertilizer preparations. According to DE 42 18 243, mixtures of glycerophospholipids and urea can be used to activate certain hydrocarbon-consuming microorganisms so that they degrade mineral oil contamination in soil more quickly. Building on this knowledge, the teaching of DE 44 37 313 proposes using phospholipids and phospholipid derivatives, above all in admixture with urea, to stimulate even those microorganisms which live naturally in uncontaminated soil in order to promote the growth of the plants growing in the soils thus treated by a kind of general fertilizing effect.

Now, the invention is based on an observation which goes even further: the use of the above-mentioned mixtures to be described in detail hereinafter provides for intervention in and hence biological control of the highly complex life system of the soil. The objective in this regard is the control and/or reduction of plant-parasitic nematode growth and, hence, the growth of selected strains of soil fauna by stimulation and hence growth promotion of selected strains of soil microorganism flora in the form of bacteria and/or fungi.

It is known in principle that the so-called rhizosphere, i.e. the boundary layer of soil a few millimeters thick in the region of the plant roots and, in particular, the root hairs, harbours a high population of bacterial strains (microorganism flora) which, on the one hand, promote the exchange of matter between the plant roots and the soil, but which on the other hand are also capable of protecting this life-sustaining in-soil part of the plants. The same applies to the mycorrhiza region of the interaction between plant roots and fungus populations in the soil. The teaching according to the invention is based inter alia on the observation that addition of the soil additives according to the invention also strengthens those microorganism populations and, hence, bacterial and/or fungal strains in the soil which develop nematostatic and/or nematicidal activity towards plant-parasitic nematodes and which therefore not only prevent or at least restrict the further build-up of nematode populations in the soil, but also and above all limit the penetration of already existing nematodes into the plant roots. Irrespective of this and in addition to this hitherto unknown effect, the already known general fertilizing effect for promoting growth irrespective of nematodes remains intact for the use of the described mixtures.

This affords important advantages over the teaching according to U.S. Pat. Nos. 5,057,141 and 4,536,207 cited above. The mixture introduced into the endangered areas of soil, preferably in the form of a liquid aqueous formulation, can be added to the soil both before and at least partly during the germination and/or growth phase(s) of the plants to be protected. A corresponding treatment may be carried out just once and/or repeated as often as required, depending on demand. In another preferred embodiment of the invention, plant-physiologically compatible wetting agents, more especially of the o/w type, are added to the aqueous preparations of the soil additive. These wetting agents support the spreading of the aqueous phase introduced in the upper layers of soil and, hence, especially in the growth region of the plant roots. It is possible in this way directly to stimulate the growth of the microorganism flora strains in the rhizosphere and/or corresponding mycorrhiza strains and hence to strength their nematostatic and/or nematicidal activity. Accordingly, it will readily be appreciated that distinctly improved results can be achieved, even in the cultivation of crops particularly vulnerable to nematodes, such as sugar beet, by applying the teaching according to the invention.

The mixtures to be used in accordance with the invention are characterized by a combination of selected representatives of class (a)—compounds of phosphorus containing at least partly lipophilic organic radicals—and class (b)—urea and/or urea derivatives—as defined in the foregoing. Preferred components of class (a) are esters of phosphoric acid with monohydric and/or polyhydric alcohols which have lipophilic radicals in their molecular structure. Partial esters of phosphoric acid are also particularly suitable, generally being used in the form of their (partial) salts.

Accordingly, suitable phosphoric acid esters are partial esters of fatty alcohols which introduce the required lipophilic component into the phosphoric acid ester molecule through the hydrocarbon radical of the fatty alcohol. Partial esters of phosphoric acid with straight-chain fatty alcohols, of which at least a substantial proportion has been produced using $C_{6-10}$ fatty alcohols and/or lower ethoxylates thereof, are particularly suitable. However, the phosphoric acid esters of higher fatty alcohols, for example containing 12 to 24 carbon atoms, are also suitable in principle, particular significance also attaching here to correspondingly olefinically unsaturated fatty alcohols.

However, particularly preferred phosphoric acid esters of class (a) are phospholipids and phospholipid derivatives. It is known that phospholipids and their derivatives are amphiphilic substances which are obtained from vegetable or animal cells. Preferred phospholipids for the purposes of the teaching according to the invention are corresponding compounds of vegetable origin or phospholipid derivatives obtained therefrom. Particularly preferred representatives of this class of components (a) are the glycerophospholipids which, normally, are also referred to as lecithin. The sphingophospholipids are less preferred. Known representatives which may be used in accordance with the invention are the diacyl phospholipids, phosphatidyl cholines, phosphatidyl ethanolamines, phosphatidyl inositols, phosphatidyl serines, phosphatidyl glycerols, phosphatidyl glycerophosphates, diphosphatidyl glycerol, N-acyl phosphatidyl ethanolamine and phosphatidic acid. Monoacyl phospholipids, lysophosphatidyl cholines, lysophosphatidyl ethanolamines, lysophosphatidyl inositols, lysophosphatidyl serines, lysophosphatidyl glycerols, lysophosphatidyl glycerophosphates, lysodiphosphatidyl glycerols, lyso-n-acyl phosphatidyl ethanolamines and lysophosphatidic acid are preferred. The phosphatidyl glycerides are obtainable on an industrial scale and available in large quantities. They are marketed as vegetable or animal lecithins and cephalins. These preparations are obtained, for example, from oils, such as corn oil, cottonseed oil or soybean oil. According to the invention, preferred components of class (a) are enzymatically hydrolyzed glycerophospholipids (enzymatically hydrolyzed lecithin) which have a more hydrophilic character through the elimination of a fatty acid ester. Only those products which have lost their phosphoric acid residue through the enzymatic hydrolysis are excluded.

According to the invention, urea and/or urea derivatives are introduced as an essential nitrogen source into the areas of soil to be protected as components of class (b) together with the phospholipids mentioned above. In its important embodiments, the teaching according to the invention is further characterized by an additional determining parameter which governs the quantity ratios in which components (a) and (b) are used. As a general rule, the mixtures of the particular components selected from these two classes are used in such quantity ratios that the calculable ratio by weight of carbon (C) to nitrogen (N) in the mixture of components (a) and (b) does not exceed about 6:1. Mixtures of component (a) to component (b) in which the ratio by weight of C to N is no more than 5:1 are preferred, mixtures in which that ratio by weight does not exceed 3:1 to 4:1 being particularly preferred. A suitable lower limit to the ratio by weight of C to N is 1:1 to 1.2:1, a maximum of about 2.5:1 and, more particularly, in the range from about 1.5:1 to 2:1 being particularly preferred. Any nitrogen atoms present in component (a) are included in the calculation of the C:N ratio.

If phospholipids are used as representatives of the class (a) components—together with urea or urea derivatives as essential nitrogen source—in the mixtures according to the invention, quantity ratios (expressed as parts by weight, based on the non-aqueous starting materials) of 3:1 to 1:3 parts of phospholipid to urea or urea derivative are normally suitable. In one preferred embodiment, substantially equal quantities of these basic components are used in admixture with one another.

According to the invention, suitable urea derivatives are in particular the oligoureas or polyureas formed by condensation of the primary urea molecule. It is known that they are distinguished in practice by slow decomposition and hence by a long-term fertilizing effect. A long-term effect such as this may be entirely desirable for the objective according to the invention of biogenic nematode control by strengthening the antagonistic and/or nematicidal potential of bacterial and/or fungal populations present in the soil. In general, however, urea as such is at least partly used as the nitrogen source. Reference is made in this connection to another possible modification: other nitrogen sources known from fertilizer technology are also suitable as a constituent of the multicomponent mixtures to be used in accordance with the invention. Corresponding ammonium salts in particular are suitable in this regard, combinations of ammonium salts/urea being important nitrogen sources in the context of the teaching according to the invention. Further references to suitable urea derivatives can be found, for example, in the above-cited U.S. Pat. No. 5,057,141, column 9, lines 40 to 50.

The quantity in which the soil additive according to the invention is applied in each individual case is determined by a number of factors. These include inter alia the time at which the multicomponent mixture is applied in dependence upon the planned or existing cultivation program, the state of the soil, more especially in regard to the soil fauna already present and, in particular, the discernible nematode infestation, the sensitivity of the plants to be cultivated to the effect of plant-parasitic nematodes and the like. Suitable quantity ranges for the application and introduction of the soil additive according to the invention for protecting plants against nematode infestation are normally at least 0.2 to 0.5 g/m$^2$ soil surface area, based on the water-free combinations of phospholipids and urea or urea derivatives. Particularly preferred ranges for suitable quantities of the soil additives according to the invention, again based on the water-free mixtures, are above 1 g/m$^2$ to about 50–60 g/m$^2$ and preferably from 10 to 40 g/m$^2$ soil surface area.

The aqueous preparations of the soil additives preferably used in accordance with the invention are generally formulated as corresponding aqueous emulsions and/or dispersions. To produce these aqueous dispersions, to facilitate their penetration into the soil and, in particular, to spread the aqueous preparation in the soil, surface-active auxiliaries are also used in the aqueous preparations in the preferred embodiment of the invention. Suitable surface-active auxiliaries are, in particular, biologically compatible emulsifiers of the o/w type which, in turn, are degradable in particular through the usual metabolism processes of the soil microorganisms. Although corresponding anionic surfactants are suitable, nonionic surfactants that are rapidly and completely biodegradable are particularly preferred for the purposes of the invention.

Suitable anionic surfactants are, for example, soaps and biodegradable alkyl sulfates, more especially fatty alcohol sulfates. Suitable representatives are the partial esters of phosphoric acid with fatty alcohols and, in particular, corresponding partial esters with linear fatty alcohols of preferably natural origin and hence with an even number of carbon atoms. For example, corresponding esters of relatively short-chain fatty alcohols, for example containing 6 to 10 carbon atoms in the fatty alcohol molecule, are suitable. However, alkyl phosphates with relatively long-chain fatty alcohol radicals, for example containing 12 to 24 carbon atoms are also suitable. In the case under discussion, therefore, polyfunctional significance attaches to selected representatives of the class (a) components according to the invention. In addition to the interactions with the components of class (b) discussed above, use can be made here of the surface-active function of the phosphoric acid partial esters mentioned.

According to the invention, particularly preferred biodegradable surfactants are corresponding, at least predominantly nonionic compounds which are preferably based at least predominantly on natural materials and have preferred HLB values in the range from 10 to 18. According to the invention, a particularly preferred class of surfactants are the alkyl (oligo)glycoside compounds of which the alkyl chain derives at least predominantly from straight-chain fatty alcohols. Compounds of this type, which are now also known as APG® components, are surface-active auxiliaries with a broad range of applications. It is known that APG®-based wetting agents can be based entirely on natural materials. Reference is made to the extensive scientific knowledge and literature on the production and properties of APG® compounds of the type in question, see for example the book by Hill et al. entitled "Alkylpolyglycosides", VCH-Verlagsgesellschaft mbH, Weinheim 1997.

However, other biodegradable and compatible surfactant components with comparable properties are also suitable. These include in particular corresponding glucamines, glucamides or even sugar partial esters of monocarboxylic acids containing in particular 8 to 24 carbon atoms, sorbitan esters, for example of the sorbitan monostearate or sorbitan monooleate type, and also surfactants of biological origin. Examples of biological surfactants include sophorose lipid, trehalose lipid or the lipopeptides known as metabolism products or membrane constituents of a large number of microorganism strains. Further particulars of biologically acceptable surface-active components can be found in DE 44 37 313 which has already repeatedly cited.

In another preferred embodiment of the invention, carbon sources for the growth of the microorganism flora are also added to the above-defined additives based on phospholipid/urea or urea derivative and introduced into the affected area of soil, preferably together with the essential components mentioned above. The combined use of carriers containing P and/or N together with selected additional carbon sources for the growth of the microorganism flora is inter alia the subject of hitherto unpublished German patent application DE 197 48884.6 (H 3143), of which the disclosure is hereby included as part of the teaching of the present invention. Key statements on this additional class of carbon sources in the context of the multicomponent mixtures or soil additives according to the invention are summarized in the following.

However, reference is made beforehand to an important preferred additional parameter for multicomponent mixtures of the type under discussion:

In the context of the teaching of the present invention, preferred multicomponent mixtures for introduction into the soil are those in which the quantity ratios of the C- and/or N-containing components used are adapted to one another in such a way that ratios by weight of C to N of about 6:1 and preferably of about 3 to 4:1 are not exceeded. It may even be of advantage to limit the C:N ratio present in the particular multicomponent mixture used to values of at most about 2 to 2.5:1.

Where the additional carbon sources mentioned above are used in the soil additives according to the invention, it can be important so far as the choice of components insoluble in the aqueous phase is concerned to select compounds which at least partly have pour points of or below 25 to 30° C. and, more particularly, of or below 10 to 15° C. Suitable components such as these are, for example, olefinically unsaturated $C_{12-24}$ fatty alcohols, more particularly of natural origin. Particular significance attaches in this regard to at least predominantly $C_{16/18}$ fatty alcohols with a high degree of olefinic double bonds and solidification ranges of or below 20° C. and preferably of or below 10 to 15° C.

Preferred representatives of such additional carbon sources are oil-soluble, but biologically compatible organic compounds containing aliphatic and/or olefinically unsaturated and, in particular, at least predominantly linear hydrocarbon radicals containing at least 6 carbon atoms and, more particularly, at least 8 carbon atoms. Corresponding compounds functionalized with oxygen as hetero atom are particularly preferred. Typical examples of such compounds are fatty alcohols and/or fatty acids or derivatives thereof, such as esters, more especially partial esters, ethers and/or amides. In the modification under discussion here where carbon sources are additionally used, additives which, in addition to carbon, also contain nitrogen in their molecular structure can be particularly suitable. Typical examples are betaines, proteins and aminocarboxylic acids and derivatives and salts thereof.

As already mentioned, the use of additional carbon sources is a possible measure, but by no means a compulsory measure in the context of the teaching of the invention. The essence of the teaching of the invention lies in strengthening the nematostatic/nematicidal effect of the multicomponent mixture—introduced as far as the rhizosphere through the liquid formulation—of components (a) and (b) and, more particularly, of phospholipids and urea or urea derivatives. This effect is also achieved without using the additional carbon sources just mentioned.

The principle according to the invention of strengthening the growth of antagonistic and/or nematicidal microorganisms in the form of soil bacteria and/or fungi leads to rapidly pronounced effects, especially in cases where corresponding microorganism populations acting as starter cultures already exist in the areas of soil to be treated. Bearing in mind the widespread occurrence of plant-parasitic nematode strains, a correspondingly broad presence of microorganism populations suitable for the purposes of the invention can be assumed to exist in agricultural soil. However, use can additionally be made in known manner of contemporary scientific knowledge for introducing cultures of suitable bacterial and/or fungal strains with the required antagonistic or nematicidal effects as starter cultures into the area of soil to be treated. Reference may be made in this connection to general scientific knowledge, cf. for example the following publications: J. Coosemans (1991), "Methods for Introducing *Verticillium chlamydosporium* into soil" in: KERRY, B. R & CRUMP, D. H.: Methods for Studying Nematophagus Fungi. IOBC/WPRS Bulletin XIV/2; 39–45 and A. Ciancio (1995), "Observations on the Nematicidal Properties of Some Mycotoxins", Fundam. Appl. Nematol. 18(5); 451–454.

Another possible variant of the teaching of the invention lies in the combination of measures known from the prior art for controlling nematodes and the measures now being proposed in accordance with the present invention. In particular, the water-insoluble components or mixtures thereof, more particularly based on chitin or chitin/protein complexes, may first be incorporated in the area of soil to be treated, as proposed in the above-cited U.S. Pat. Nos. 5,057,141 and 4,536,207 and the literature cited therein, the advantages of the multicomponent mixtures to be introduced in accordance with the invention in the form of an aqueous preparation then being additionally utilized, more especially in the course of plant growth. It will readily be appreciated that the biogenic strengthening and protective function of the microorganism strains to be strengthened in accordance with the invention are achieved in a particularly pronounced form by this combination of working steps.

The multicomponent mixtures to be used in accordance with the invention may be prepared and stored in the form of aqueous concentrates which are diluted with water before application to the soil. According to the invention, suitable concentrates have the following composition for example: 10 to 30% by weight of lecithin and/or lecithin hydrolyzate; 10 to 30% by weight of urea or urea derivative; 1 to 10% by weight of surfactant, optionally other auxiliaries and, for the rest, water to 100% by weight. Concentrates of this type are preferably diluted with water in a ratio of 1:20 to 1:100 before application to the soil to be protected. The aqueous preparation may be applied any known method. Both uniform distribution of the liquid phase over the soil surface and controlled injection, for example by the so-called Hydro-Ject process, are suitable. Even where the aqueous multicomponent mixtures are injected into the soil, the surface-active components used in accordance with the invention promote horizontal spreading thereof.

In particular, however, the use of the components or multicomponent mixtures according to the invention may also be combined with the addition of conventional nematicides. These chemical agents, which are now widely used, are the subject of numerous printed publications, cf. for example the book by H. Börner entitled "Pflanzenkrankheiten und Pflanzenschutz", 5th Edition, Verlag Eugen Ulmer, Stuttgart, 1983, pages 128 to 132.

If the teaching according to the invention is applied in combination with conventional nematicides, the quantity in which these conventional chemicals are used can be substantially reduced without any danger of serious losses of effect. In this way, savings of known nematicides, which normally go back to synthetic chemistry, of at least 30% and preferably of at least 50 to 75% can be made without any danger of losses of growth and/or yield.

The following Examples describe the use of the soil additives according to the invention and the resulting reduction in the nematode infestation of plant roots coupled with a substantial increase in the live weight of the plants compared with controls.

EXAMPLES

The experiments described in the following Examples were carried out against the following background: in the vicinity of plant roots—in the rhizosphere—there is an increased supply of organic acids, for example citric acid, which are secreted through the roots. This makes it easier for plant roots to take up nutrient ions dissolved in ground water. By virtue of this increased supply of nutrients, the rhizosphere is a zone of high biological and microbiological activity.

It is known that rhizosphere bacteria strengthen the immune system of plants and, accordingly, can make it difficult for nematodes to penetrate into the roots. Strains of *Pseudomonas fluorescens* above all are described.

In the experiments according to Example 1 below carried out as microplot field trials, a soil additive formulated in accordance with the invention and added rhizosphere bacteria were tested for their effectiveness in reducing the degree of penetration of the cyst nematode *Heterodera schachtii* into the roots of sugar beet plants. The area selected was known to be infested with the nematodes mentioned.

An aqueous concentrate of the following components is used as the active-substance combination to be applied in accordance with the invention:

19.9% by weight urea (N source)

19.8% by weight enzymatically hydrolyzed soya lecithin (commercial product "Lipothin NE") as N and P source 1.0% by weight of the APG®-based o/w wetting agent with predominantly $C_{12/14}$ fatty alcohol radicals ("APG® 600") as emulsion stabilizer and water to 100% by weight.

Example 1

In the microplot field trial, three developments are followed, namely:

1. sugar beet development without additives (control)
2. sugar beet development in the presence of an inoculation of *Pseudomonas fluorescens*
3. sugar beet development in the presence of an inoculation of *Pseudomonas fluorescens* and an addition of the soil additive according to the invention In all the studies, a sufficiently large number of plants was planted to allow statistically relevant evaluation of the field trials.

The following procedure was followed:

The sugar beet seeds—standardized seeds treated with methyl cellulose—were partly treated with a solution of *Pseudomonas fluorescens* bred in the laboratory. Although the starting germ density, based on empirical values, was sufficiently high at $10^7$ to $10^8$ germs/seed, so that a plant-strengthening effect should have been obtained, the detectable living germ count fell in a few hours to $10^4$ germs/seed grain as a result of drying of the coating composition. As expected, this bacterial count would not be sufficient to achieve plant-strengthening effects, but would correspond to the bacterial mass which would be established under natural conditions, i.e. by colonization of the roots by soil bacteria. Accordingly, the seeds used here were eminently suitable for determining the synergistic effect between rhizosphere bacteria and the soil additive according to the invention.

The studies involving the soil additive according to the invention were carried out as follows: after the seeds had germinated, they were treated with the soil additive according to the invention by watering. The concentrate defined above was used in a quantity of 20 g/m². To apply the aqueous preparation, the concentrate was diluted with water in a ratio of 1:50, i.e. 20 g of concentrate per liter of water were applied per square meter.

In all the experiments, the growth period of the sugar beet was 3 months. Since the tests were field trials, evaluation was carried out only at the end of each trial by determining the nematode infestation in the roots. The following results were obtained;

Compared with the untreated control, no effects were observed where the rhizosphere bacteria alone were added.

The combination of "inoculation with rhizosphere bacteria" and "application of the soil additive according to the invention" produced a reduction in the nematode infestation of 30%. The sugar beet yield over the test period was also slightly increased.

Example 2

The direct effect of the soil additive according to the invention on the level of penetration of the cyst nematode *Heterodera schachtii* into the roots of young sugar beet plants was determined in a second series of tests. The tests were carried out as pot tests in a greenhouse. In this case, too, tests on the one hand without addition of the multicomponent mixtures according to the invention (control) and corresponding tests involving addition of the soil additive according to the invention were compared with one another. This series of tests was carried out under the following conditions:

An unsterile mixture of field soil and sand in a quantity of 150 cm³ per pot was used as the substrate. Each test with and without addition of the multicomponent mixtures according to the invention was repeated 10 times. 10 sugar beet seeds were sown in each pot; after germination, the plants were thinned out to 5 per pot. Inoculation with cysts of *Heterodera schachtii* was carried out 7 days after sowing. The soil additive according to the invention was applied one day after inoculation with the nematode cysts. The concentrate according to the invention was applied in a quantity of 40 g/m², being diluted with water in a ratio of 1:50 for application. The tests were evaluated 3 weeks after inoculation with the nematodes.

In this case, evaluation was carried out by determining the fresh weights of shoots and roots and the degree of penetration of nematodes into the roots.

Comparison of the controls with the samples treated in accordance with the invention produced the following results: compared with the control (100%), the following results were achieved by using the soil additive according to the invention:

reduction of the nematode penetration level by 70% plant-strengthening effect in the plants falling within the scope of the teaching according to the invention; shoot weight is doubled while root weight is increased by 150%.

In Examples 3 to 7 below, an aqueous concentrate which is marketed by applicants under the name of "TerraPy B" and which represents a mixture of the following components is used as the active-substance combination to be employed in accordance with the invention:

20% by weight urea

20% by weight enzymatically hydrolyzed soya lecithin (Lipotin NE, a product of Lucas Meyer)

1% by weight APG®600 rest water.

Example 3

Pot test with sugar beet

Methods

Sugar beet was pregerminated in a temperature-controlled (18° C.) greenhouse and, at the two-leaf stage, the plants were each transplanted in a plastic pot (9×9 cm) filled with 500 g of a mixture of field soil and sand (1:1). The test substances were applied 2 days after transplanting. One day later, each pot was inoculated with 500 larvae of the nematode *Heterodera schachtii*. 6 Weeks later, the test was terminated and the density of the nematodes and also the shoot and root weights of the plants were determined.

The following variants (with 10 repetitions each) were selected for the tests:

unfertilized untreated control fertilized control (quantity of N/P corresponds to 40 g/m² TerraPy G)

control treated with nematicide (Aldicarb, 1 ppm)

TerraPy B 20 g/m²

TerraPy B 40 g/m²

Results

Plant growth is clearly increased by the active-substance combination according to the invention, the effects on shoot weight resembling those of conventional mineral fertilization (Table 1). The active-substance combination described here affords distinct advantages in regard to the development of root weight: root weight doubled for the same nutrient input. Mineral fertilizers only promote the growth of above-ground parts of the plants but not the roots. By contrast, the active-substance mixture also promotes root development so that the plant as a whole is strengthened. The conventional nematicide (Aldicarb) used here is not effective in increasing plant weight.

TABLE 1

Effects on the plant growth of sugar beet

| Variant | Shoot weight in g | Root weight in g |
| --- | --- | --- |
| Unfertilized untreated control | 2.3 | 0.8 |
| Nematicide-treated control | 2.1 | 0.7 |
| Fertilized control | 6.0 | 1.0 |
| TerraPy B 20 g/m² | 5.5 | 1.8 |
| TerraPy B 40 g/m² | 7.2 | 2.2 |

The proliferation of the nematode *H. schachtii* was significantly suppressed by the active-substance combination according to the invention used in a quantity of 40 g/m² (Table 2). The effect was almost as pronounced as that of the nematicide used for comparison purposes.

TABLE 2

Effects on root damage

| Variant | Nematode cysts per g root weight | Significance class |
| --- | --- | --- |
| Unfertilized untreated control | 80 | a |
| Fertilized control | 40 | b |
| TerraPy B 20 g/m² | 40 | b |
| Nematicide-treated control (Aldicarb) | 15 | c |
| TerraPy B 40 g/m² | 22 | c |

The activity of bacteria in promoting plant growth and plant health is vigorously and lastingly promoted by the active-substance mixture according to the invention (Table 3). The harmful effect of the nematicide Aldicarb on the microorganisms is clearly apparent.

TABLE 3

Effects on microorganisms (bacteria per g of soil)

| Variant | 2 Days after application | 14 Days after application | 56 Days after application |
| --- | --- | --- | --- |
| Unfertilized untreated control | $7 \times 10^7$ | $8 \times 10^6$ | $2 \times 10^7$ |
| Nematicide-treated control (Aldicarb) | $7 \times 10^6$ | $8 \times 10^6$ | $1 \times 10^7$ |
| Fertilized control | $4 \times 10^7$ | $2 \times 10^7$ | $1 \times 10^7$ |
| TerraPy B 20 g/m² | $1 \times 10^8$ | $1 \times 10^7$ | $8 \times 10^7$ |
| TerraPy B 40 g/m² | $5 \times 10^8$ | $1 \times 10^7$ | $5 \times 10^7$ |

Example 4

Pot test with tomatoes

Methods

Tomatoes were pregerminated in a temperature-controlled (18° C.) greenhouse and, at the two-leaf stage, the plants were each transplanted in a plastic pot (9×9 cm) filled with 500 g of a mixture of field soil and sand (1:1). The test substances were applied 2 days after transplanting. One day later, each pot was inoculated with 1,000 larvae of the nematode *Meloidogyne incognita*. 8 Weeks later, the test was terminated and the density of the nematodes and also the shoot and root weights of the plants were determined.

The following variants (with 10 repetitions each) were selected for the tests:

unfertilized untreated control fertilized control (quantity of N/P corresponds to 40 g/m² TerraPy B)

control treated with nematicide (Aldicarb, 1 ppm)

TerraPy B 20 g/m²

TerraPy B 40 g/m²

Results:

Plant growth is clearly increased by the active-substance mixture according to the invention, a quantity of 20 g/m² having a better fertilizing effect than twice the dose of a mineral fertilizer (Table 1). Conventional nematicides, such as the Aldicarb used here, are not effective in increasing plant weight, but do promote root length development in the same way as the active-substance mixture described here.

TABLE 1

Effects on the plant growth of tomatoes

| Variant | Shoot weight in g | Root weight in g | Root length in cm |
| --- | --- | --- | --- |
| Unfertilized untreated control | 4.8 | 1.6 | 4.5 |
| Nematicide-treated control | 4.7 | 1.5 | 12.0 |
| Fertilized control | 8.2 | 2.1 | 7.0 |
| TerraPy B 20 g/m² | 8.5 | 2.4 | 10.1 |
| TerraPy B 40 g/m² | 9.8 | 2.7 | 11.5 |

The proliferation of the *M. incognita* was significantly suppressed by the active-substance combination according to the invention (Table 2). The effect was weaker than that of the nematicide used for comparison purposes, but significantly stronger than that of a mineral fertilizer. The gall index is a measure of the damage caused to the root system by the nematodes and is basically a scale of 1 to 10 where 1=undamaged and 10=completely damaged root system.

TABLE 2

Effect on the root system

| Variant | Gall index | Significance class |
|---|---|---|
| Unfertilized untreated control | 8.1 | a |
| Fertilized control | 7.2 | b |
| TerraPy B 20 g/m$^2$ | 6.2 | c |
| TerraPy B 40 g/m$^2$ | 6.0 | c |
| Nematicide-treated control | 3.9 | d |

The activity of bacteria in promoting plant growth and plant health is vigorously and lastingly promoted by the active-substance mixture according to the invention (Table 3). The harmful effect of the nematicide Aldicarb on the microorganisms is clearly apparent.

TABLE 3

Effects on microorganisms (bacteria per g of soil)

| Variant | 2 Days after application | 14 Days after application | 56 Days after application |
|---|---|---|---|
| Unfertilized untreated control | $6 \times 10^7$ | $3 \times 10^7$ | $1 \times 10^6$ |
| Nematicide-treated control | $1 \times 10^7$ | $4 \times 10^7$ | $1 \times 10^6$ |
| Fertilized control | $2 \times 10^6$ | $7 \times 10^7$ | $1 \times 10^6$ |
| TerraPy B 20 g/m2 | $3 \times 10^7$ | $1 \times 10^8$ | $2 \times 10^7$ |
| TerraPy B 40 g/m2 | $1 \times 10^8$ | $2 \times 10^8$ | $2 \times 10^7$ |

Example 5

Pot test with tomatoes

Methods

Tomatoes were pregerminated in a temperature-controlled (18° C.) greenhouse and, at the two-leaf stage, the plants were each transplanted in a plastic pot (9×9 cm) filled with 500 g of a mixture of field soil and sand (1:1). The test substances were applied 2 days after transplanting. One day later, each pot was inoculated with 1,000 larvae of the nematode *Meloidogyne incognita*. 8 Weeks later, the test was terminated and the density of the nematodes and also the shoot and root weights of the plants were determined.

The following variants (with 8 repetitions each) were selected for the tests:

unfertilized untreated control fertilized control (quantity of N/P corresponds to 40 g/m$^2$ TerraPy B)

control treated with nematicide (Aldicarb, 1 ppm)

TerraPy B 20 g/m$^2$

TerraPy B 2 g/m$^2$

The object of this test was to investigate the smaller effective dose of the product.

Results:

Plant growth is clearly increased by the active-substance mixture according to the invention, the quantity applied of 20 g/m$^2$ having a significantly better fertilizing effect than the same dose of mineral fertilizer (Table 1).

TABLE 1

Effects on the plant growth of tomatoes

| Variant | Shoot weight in g | Significance class |
|---|---|---|
| Unfertilized untreated control | 3 | a |
| Nematicide-treated control | 4.2 | b |
| Fertilized control | 6.1 | c |
| TerraPy B 20 g/m$^2$ | 8.6 | d |
| TerraPy B 40 g/m$^2$ | 5.2 | bc |

The proliferation of the nematode *M. incognita* was significantly suppressed by the active-substance combination according to the invention (Table 2). The effect was not as pronounced as that of the nematicide used for comparison purposes, but was significantly stronger that that of the mineral fertilizer. For the meaning of the gall index, see Example 4.

TABLE 2

Effects on the root system of tomatoes

| Variant | Gall index | Significance class |
|---|---|---|
| Unfertilized untreated control | 8.1 | d |
| Fertilized control | 6.9 | c |
| TerraPy B 2 g/m$^2$ | 6.8 | c |
| TerraPy B 20 g/m$^2$ | 5.2 | b |
| Nematicide-treated control | 4.2 | a |

The activity of bacteria in promoting plant growth and plant health is vigorously and lastingly promoted by the active-substance mixture according to the invention (Table 3). The harmful effect of the nematicide Aldicarb on the microorganisms is clearly apparent.

In practice, the dose of 2 g/m$^2$ described here of the active-substance mixture according to the invention is regarded as the lower limit for effective nematode suppression. However, stimulation of the microorganism flora was still in evidence, even with the small dose described here (Table 3).

TABLE 3

Effects on microorganisms (bacteria per g of soil)

| Variant | 2 Days after application | 14 Days after application | 56 Days after application |
|---|---|---|---|
| Unfertilized untreated control | $4 \times 10^7$ | $2 \times 10^6$ | $1 \times 10^6$ |
| Nematicide-treated control | $6 \times 10^6$ | $1 \times 10^6$ | $5 \times 10^5$ |
| Fertilized control | $7 \times 10^6$ | $2 \times 10^6$ | $2 \times 10^6$ |
| TerraPy B 2 g/m$^2$ | $3 \times 10^7$ | $7 \times 10^6$ | $3 \times 10^6$ |
| TerraPy B 20 g/m$^2$ | $9 \times 10^7$ | $1 \times 10^7$ | $7 \times 10^6$ |

Example 6

Pot test with tomatoes: reduction of nematicides

Methods

Tomatoes were pregerminated in a temperature-controlled (18° C.) greenhouse and, at the two-leaf stage, the plants were each transplanted in a plastic pot (9×9 cm) filled with 500 g of a mixture of field soil and sand (1:1). The test substances were applied 2 days after transplanting. One day later, each pot was inoculated with 1,000 larvae of the nematode *Meloidogyne incognita*. 6 Weeks later, the test was terminated and the density of the nematodes and also the shoot and root weights of the plants were determined.

The following variants (with 10 repetitions each) were selected for the tests:
- unfertilized untreated control
- fertilized control (quantity of N/P corresponds to 40 g/m² TerraPy B)
- control treated with nematicide (Aldicarb, 1 ppm)
- TerraPy B 20 g/m²
- TerraPy B 20 g/m² plus Aldicarb 0.1 ppm In addition, pots with all the variants mentioned above which had not been inoculated with nematodes were included in the tests.

Results:

Plant growth is clearly increased by the active-substance mixture according to the invention, the quantity applied of 20 g/m² having as good a fertilizing effect as the same dose of a mineral fertilizer (Table 1). Conventional nematicides, such as the Aldicarb used here, are completely ineffective on their own in promoting plant weight whereas a combination of Aldicarb in a dose reduced to one tenth with the active-substance combination according to the invention produced the highest root weights.

TABLE 1

Effects on the plant growth of tomatoes

| Variant | Shoot weight in g | Root weight in g | Significance class |
|---|---|---|---|
| Unfertilized untreated control | 4 | 1.5 | a |
| Aldicarb 1 ppm | 3 | 1.8 | a |
| Fertilized control | 10.2 | 3.1 | b |
| TerraPy B 20 g/m² | 9.9 | 3.5 | b |
| TerraPy B 20 g/m² plus Aldicarb 0.1 ppm | 9.9 | 4.5 | c |

The proliferation of the nematode *M. incognita* was significantly suppressed by the active-substance combination according to the invention (Table 2). The effect was not as pronounced as that of the nematicide used for comparison purposes, but was stronger than that of a mineral fertilizer. A combination of Aldicarb in a dose reduced to one tenth with the active-substance combination according to the invention afforded the root system very good protection against nematode damage.

TABLE 2

Effects on the root system

| Variant | Gall index | Significance class |
|---|---|---|
| Unfertilized untreated control | 7 | e |
| Fertilized control | 6.2 | d |
| TerraPy B 20 g/m² | 5.0 | c |
| TerraPy B 20 g/m² plus Aldicarb 0.1 ppm | 3.5 | b |
| Aldicarb 1 ppm | 0.5 | a |

Example 7

Pot test with tomatoes: combination with mycorrhiza

Methods

Tomato seeds were planted in plastic pots (9×9 cm) each filled with 320 g of a mixture of field soil and sand (1:1) in a temperature-controlled greenhouse (18° C.). The test substances were applied 29 days after emergence. Two days later, each pot was inoculated with 1,500 larvae of the nematode *Meloidogyne incognita*. 9 Weeks later, the test was terminated and the density of the nematodes and the shoot and root weights of the plants were determined.

The following variants (with 10 repetitions each) were selected for the tests:
- unfertilized untreated control
- fertilized control (quantity of N/P corresponds to 2 g/m² TerraPy B)
- nematicide-treated control (Aldicarb, 1 ppm)
- mycorrhiza fungus mixture 0.2%
- TerraPy B 2 g/m²
- TerraPy B 2 g/m² plus mycorrhiza 0.2%

The mycorrhiza fungus mixture contained a mixed population of various Glomus strains of the species *Glomus sclerocystis* and *G. gigasporum* with 950 infectious units per cm³ (=0.64 g per pot). The mixture was mixed with the pot soil after dilution to 0.2% at the beginning of the test.

Results:

Plant growth is clearly increased by the active-substance combination according to the invention, the quantity applied of 2 g/m² having a better fertilizing effect than the same dose of a mineral fertilizer (Table 1). Mycorrhiza fungi do not contain any plant nutrients, but do promote the digestion of plant nutrients after successful root colonization, as reflected in the very good fresh weight of the shoots. The combination of mycorrhiza plus active-substance mixture TerraPy B produced significantly the highest shoot weight.

TABLE 1

Effects on the plant growth of tomatoes

| Variant | Shoot weight in g | Significance class |
|---|---|---|
| Unfertilized untreated control | 4.0 | e |
| Aldicarb 1 ppm | 4.2 | de |
| Fertilized control | 4.8 | cde |
| TerraPy B 2 g/m² | 5.0 | bcd |
| Mycorrhiza | 5.1 | abc |
| TerraPy B 2 g/m² plus mycorrhiza | 5.8 | a |

The proliferation of the nematode *M. incognita* was significantly suppressed by the active-substance combination according to the invention (Table 2). The effect was not as pronounced as that of the nematicide used for comparison purposes, but was stronger than that of mycorrhiza fungi. The combination of the mycorrhiza mixture with the active-substance combination according to the invention afforded the root system very good protection against nematode damage (comparable with the effect of a nematicide), reducing nematode damage by 70%.

TABLE 2

Effects on the root system

| Variant | Number of galls per root system | In percent | Significance class |
|---|---|---|---|
| Unfertilized untreated control | 115 | 100% | a |
| Fertilized control | 110 | 96% | a |
| Mycorrhiza | 60 | 52% | b |
| TerraPy B 2 g/m² | 50 | 43% | bc |
| Terrapy B 2 g/m² plus mycorrhiza | 35 | 30% | cd |
| Aldicarb 1 ppm | 22 | 19% | d |

What is claimed is:

1. A soil additive composition comprising: (a) a phosphorus compound having at least a partly lipophilic organic radical and (b) urea or a urea derivative wherein the weight ratio of (a) to (b) is such that the ratio by weight of carbon to nitrogen in the composition has a maximum value of about 6:1.

2. The soil additive of claim 1 wherein the ratio by weight of carbon to nitrogen has a maximum value of about 5:1.

3. The soil additive of claim 1 wherein component (a) is selected from the group consisting of an ester of phosphoric acid based on a monohydric alcohol; an ester of phosphoric acid based on a polyhydric alcohol; a partial ester of phosphoric acid based on a monohydric alcohol; a partial ester of phosphoric acid based on a polyhydric alcohol; a salt of a partial ester of phosphoric acid based on a monohydric alcohol; a salt of a partial ester of phosphoric acid based on a polyhydric alcohol; and a combination thereof.

4. The soil additive of claim 3 wherein component (a) is selected from the group consisting of phosphoric acid partially esterified with a fatty alcohol; a phospholipid; a phospholipid derivative, and a combination thereof.

5. The soil additive of claim 3 wherein the carbon to nitrogen ratio is from about 3:1 to about 4:1.

6. The soil additive of claim 5 wherein the carbon to nitrogen ratio is from about 1.5:1 to about 2:1.

7. The soil additive of claim 3 wherein component (a) is a phospholipid and component (b) is urea and wherein the weight ratio (a) to (b) is from about 3:1 to about 1:3.

8. The soil additive of claim 7 wherein the weight ratio (a) to (b) is from about 3:1 to about 1:1.

9. The soil additive of claim 1 wherein component (a) is selected from the group consisting of lecithins, lecithin hydrolyzates, chemically modified lecithins, phospholipids of vegetable origin and combinations thereof.

10. A method for biologically controlling plant-parasitic soil nematodes which comprises contacting the soil with the soil additive of claim 1 wherein the amount of the additive is from about 0.2 to about 60 g/m$^2$ of soil surface.

11. The method of claim 10 wherein the soil is contacted by the additive in an aqueous medium.

12. The method of claim 10 wherein the soil is contacted with the additive during the germination or growth phase of the plants to be protected.

13. The method of claim 11 wherein the aqueous preparation is further comprised of a wetting agent.

14. The soil additive of claim 1 further comprising additional carbon sources selected from the group consisting of fatty alcohols, fatty acids, fatty acid esters, ethers, amides and combinations thereof.

15. The soil additive of claim 1 wherein the additional carbon sources are olefinically unsaturated $C_{12-24}$ fatty alcohols.

16. The soil additive of claim 1 wherein the additional carbon sources have pour points up to about 30° C.

17. The soil additive of claim 13 wherein the wetting agent is a biodegradable, nonionic surfactant.

18. The soil additive of claim 17 wherein nonionic surfactant has an HLB of from about 10 to about 18.

* * * * *